United States Patent [19]
Pugh

[11] 3,946,653
[45] Mar. 30, 1976

[54] COMBINED WEINER COOKER AND POPCORN POPPER

[76] Inventor: Mary A. Pugh, Rte. 2, Box 273, Muskogee, Okla. 74401

[22] Filed: Sept. 13, 1974

[21] Appl. No.: 505,638

[52] U.S. Cl. .................. 99/340; 99/421 HV; 126/30
[51] Int. Cl.² ......................................... A47J 37/04
[58] Field of Search ..... 99/340, 323.4, 323.5–323.6, 99/323.7–323.8, 323.9, 323.11, 339, 345, 376, 421; 126/9 R, 25, 30

[56] References Cited
UNITED STATES PATENTS

| | | | |
|---|---|---|---|
| 2,523,200 | 9/1950 | Durst, Jr. | 126/30 X |
| 2,705,450 | 4/1955 | Steinbook | 99/340 |
| 2,783,705 | 3/1957 | Vrionis | 99/421 HV |
| 2,887,944 | 5/1959 | Walker | 99/421 HH |
| 2,940,439 | 6/1960 | Bartels et al. | 126/30 |
| 3,067,734 | 12/1962 | Lucas | 126/30 |
| 3,094,113 | 6/1963 | Avila | 126/30 |
| 3,104,605 | 9/1963 | McKinney | 99/421 H |

Primary Examiner—Daniel Blum
Assistant Examiner—Arthur O. Henderson
Attorney, Agent, or Firm—Head & Johnson

[57] ABSTRACT

An apparatus for roasting or otherwise cooking wieners and for popping popcorn, said apparatus comprising a support structure having a rotatable arm member extending outwardly therefrom for removably receiving a wiener holder thereon for supporting a plurality of wieners thereon, said extended arm member adapted for supporting the wieners over a fire, or the like, whereby the wieners may be cooked or roasted as the arm is rotated about its own longitudinal axis. Alternately, the arm member may removably receive a suitable cage element whereby popcorn may be popped during rotation of the cage element as the arm member is rotated about its own longitudinal axis. The entire apparatus is particularly designed for portability for facilitating transport from site to site, and for ease of storage when not in use.

5 Claims, 13 Drawing Figures

COMBINED WEINER COOKER AND POPCORN POPPER

BACKGROUND OF THE INVENTION

1. Field of the Invention

This invention relates to improvements in cooking apparatus and more particularly, but not by way of limitation, to a combined wiener cooker and popcorn popper.

2. Description of the Prior Art

Wieners and popcorn are very popular food items today, and both are in widespread use, particularly at picnic times, and during outdoor type cooking. Of course, it is common practice to spear wieners and heat them over coals or other heat for roasting thereof. This may be an inefficient method of cooking the wieners in that they frequently accidentally fall from the spearing instrument and are rendered unedible, and there is usually a rather limited number of wieners that can be cooked simultaneously on a single spear instrument. In addition, it is frequently difficult to pop popcorn in an outside environment since it is considered necessary to agitate the popcorn during the cooking operation for achieving the desired end result. Of course, the devices usually used for cooking of the wieners and for popping the popcorn are normally completely different pieces of equipment, and this creates a problem, particularly under picnic conditions, in that it is necessary to carry additional equipment if it is desired to provide both food items.

SUMMARY OF THE INVENTION

The present invention contemplates a novel combined wiener cooker and popcorn popper wherein a single apparatus may be used for cooking both food items. The novel device comprises a support structure having a rotatable arm member extending outwardly therefrom with a handle member being provided on one end of the arm and an attachment member being provided on the opposite end of the arm for removably receiving a wiener cooker and alternately removably receiving a popcorn cooker. The wiener cooker element is particularly designed and constructed for wieners supporting a plurality of wieners whereby the wieners may be supported in spaced relation to coals or other source of heat by the extending arm member. The handle may be utilized for rotating the arm member about its own longitudinal axis for rotating the wieners above the heat source in order to roast the wieners as desired. Of course, a single wiener may be similarly cooked on the device. When it is desired to pop popcorn, the wiener cooker element may be easily removed from the attachment member and replaced by a cage-type element, or the like, which is particularly designed and constructed for housing popcorn. The popcorn housing is supported above the heat source by the arm member in substantially the same manner as the wiener cooker element, and as the arm is rotated about its longitudinal axis, the popcorn will be tumbled or agitated therein for proper popping.

The support structure is preferably of a collapsible type construction of a type similar to a camera tripod or music stand, or the like, and the arm member is preferably removably secured thereto whereby the apparatus may be collapsed and assembled into a relatively compact package during transporting thereof and storage. The novel apparatus is simple and efficient in operation and economical and durable in construction.

DESCRIPTION OF THE PREFERRED EMBODIMENT

Figure 12:
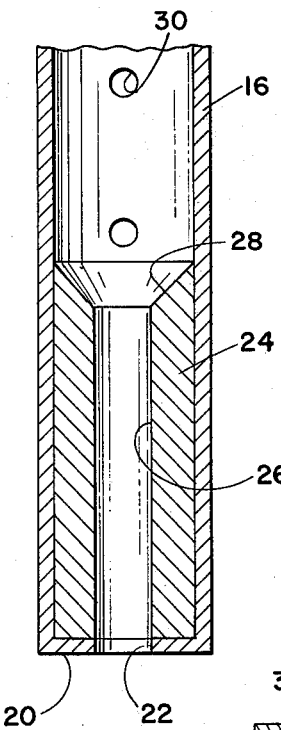
FIG. 12 is a broken sectional view of a portion of the support structure as may be used in the invention.

Referring to the drawings in detail, reference character 10 generally indicates a combined wiener cooker and popcorn popper comprising a support structure 12 having an arm member 14 carried at one end thereof and rotatable about its own longitudinal axis independent of the support structure 12. As shown herein, the support structure 12 comprises a tube member 16 having a suitable T-fitting 18 removably secured to one end thereof in any suitable manner, such as by a friction fit, but not limited thereto. The opposite end of the tube 16 is preferably closed by a suitable inwardly directed circumferential flange 20 (FIG. 12) having a central aperture 20 for a purpose as will be hereinafter set forth. In addition, a suitable insert member 24 may be provided in the tube 16 adjacent the flange 20, and is provided with a longitudinal bore 26 extending therethrough in alignment with the bore 22. The upper end of the insert 24, as viewed in FIG. 12, is tapered inwardly for a purpose as will be hereinafter set forth. In addition, a plurality of logitudinally spaced apertures 30 are provided in the side wall of the tube 16.

Figure 1:
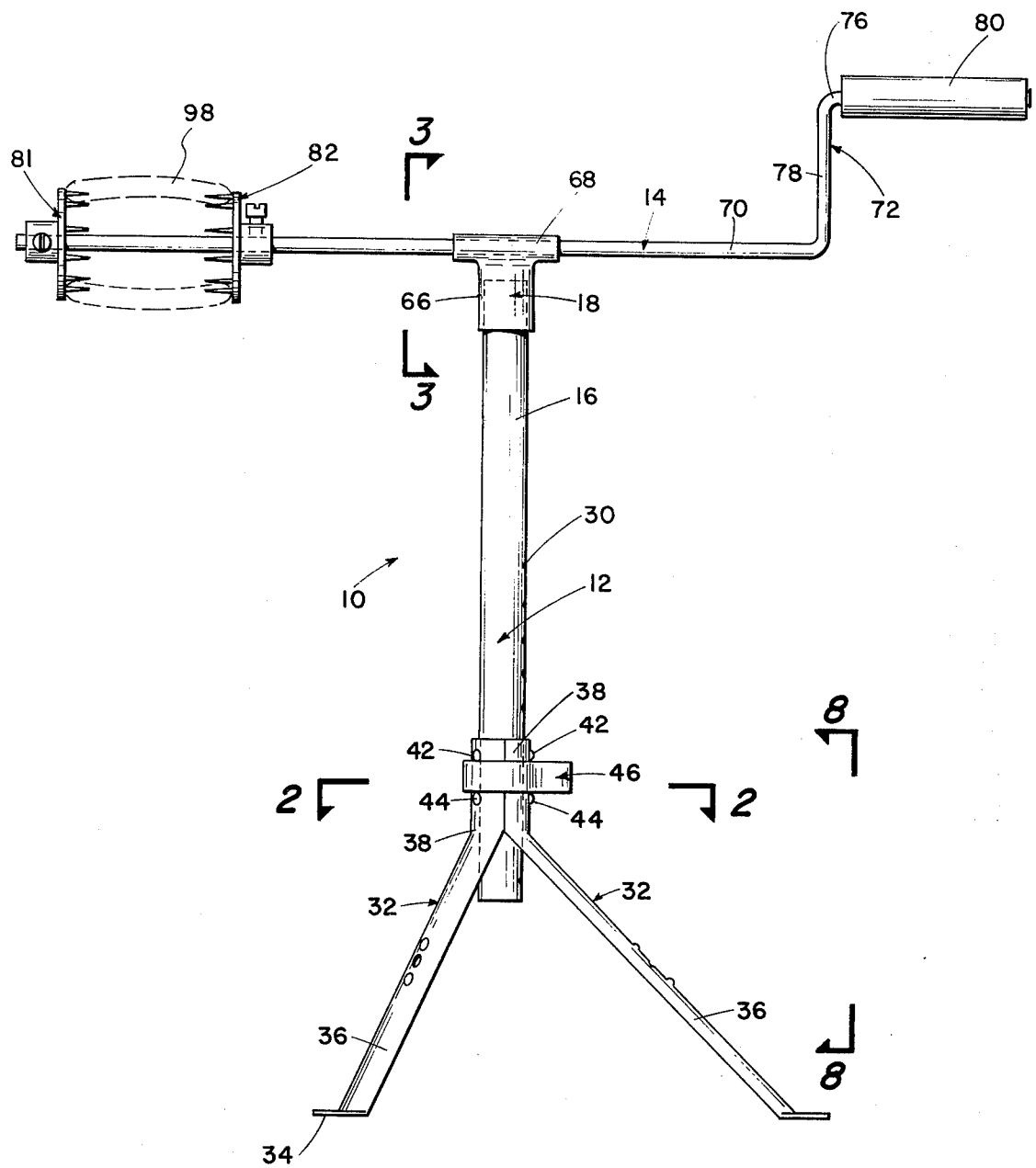
FIG. 1 is a side elevational view of a combined wiener cooker and popcorn popper embodying the invention.
Figure 2:
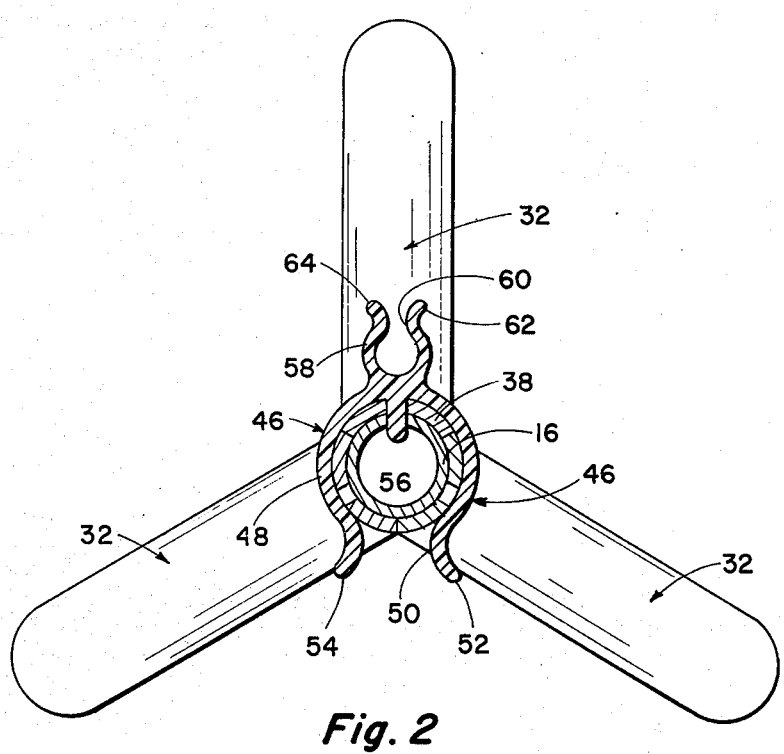
FIG. 2 is a view taken on line 2—2 of FIG. 1.
Figure 5:
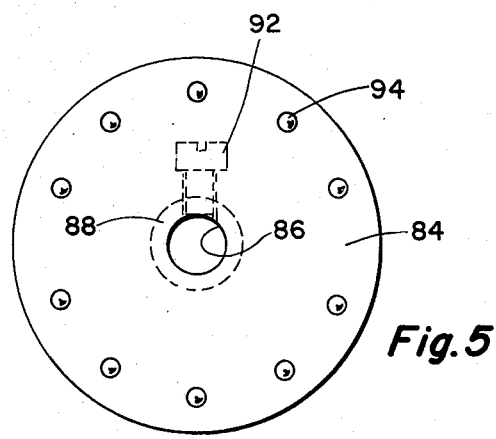
FIG. 5 is a view taken on line 5—5 of FIG. 4.
Figure 3:
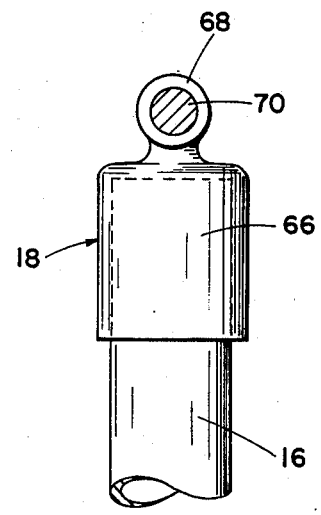
FIG. 3 is a view taken on line 3—3 of FIG. 1.

A plurality of substantially identical leg members 3, preferably three, but not limited thereto, are removably secured to the lowermost end of the tube 16 as viewed in FIG. 1 for supporting the apparatus 10 during use thereof. Each leg 32 comprises a foot portion 34 adapted for engagement with the ground, or the like, and an angularly disposed main portion 36 conterminous therewith and of an arcuate cross-sectional configuration complementary to the configuration of the outer periphery of the tube 16. Each main portion 36 is provided with an aperture 33 having protrusions 35 and 37 spaced on opposite sides thereof for a purpose as will be hereinafter set forth. The opposite end of each main portion 36 is provided with a connection member 38 of an arcuate cross-sectional configuration complementary to the configuration of the outer periphery of the tube 17, and are adapted for disposition thereagainst during use of the apparatus 10. Each connection member 38 is provided with an aperture 40 FIG. 13 therein and a pair of protrusions 42 and 44 spaced on opposite sides thereof. The connection elements 38 are adapted to be positioned against the outer periphery of the tube 16 in the assembled position of the apparatus 10 shown in FIG. 1 for a purpose and in a manner as will be hereinafter set forth.

Figure 9:
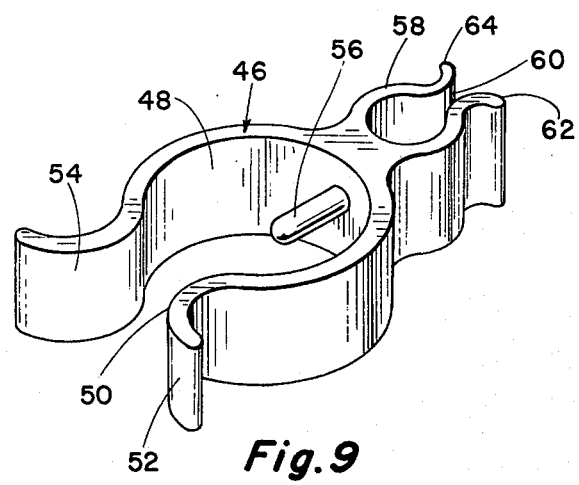
FIG. 9 is a perspective view of a clamp element as may be used in the invention.

A locking clamp 46 is provided for removably securing the connection elements 38 to the tube 16 and comprises a substantially circular central body portion 48 (FIG. 9) having an internal circumference of a size complementary to the size of the outer circumference of the connection members 38. One side of the circular body 48 is provided with a hiatus or opening 50 and the clamp 46 is provided with outwardly flaring end portions 52 and 54 conterminous with the hiatus 50. A radially inwardly extending pin member 56 is provided on the inner periphery of the central portion 48 and is oppositely disposed from the hiatus 50. It is also preferable to provide a smaller substantially circular member 58 extending radially outwardly from the outer periphery of the central body 48, and the circular member 58 is also provided with a hiatus 60 diametrically opposed from the connection of the member 58 with the member 48 as particularly shown in FIG. 9. The body 58 is provided with outwardly flaring end elements 62 and 64 conterminous with the hiatus 60 for a purpose as will be hereinafter set forth. The clamp 46 is preferably constructed from a suitable sufficiently yieldable material, such as heat resistant plastic which may be fiberglass-filled synthetic resin, whereby the ends or fingers 52 and 54 may be moved outwardly to expand the size of the hiatus 50 when necessary, and the fingers or ends 62 and 64 may be moved outwardly to expand the size of the hiatus 60 when necessary.

Figure 13:
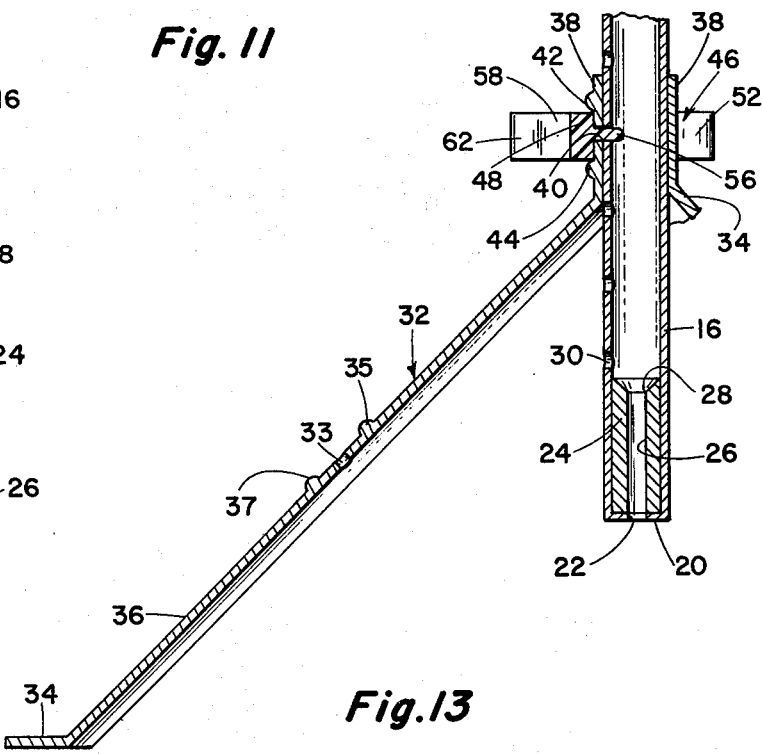
FIG. 13 is a sectional view of an additional portion of the support structure as may be used in the invention.

In order to assemble the legs 32 on the tube 16 as shown in FIG. 1, the connection members 38 of each leg 32 may be disposed adjacent the outer periphery of the tube 16 in side by side abutting relationship with the aperture 40 of one of the connection members 38 being in substantial alignment with a preselected aperture 30 of the tube 16 in accordance with the desired overall height of the apparatus 10, and as particularly shown in FIG. 13. The clamp 46 may be "snapped" into position around the outer periphery of the side by side connection members by forcing the hiatus 50 laterally thereof with sufficient pressure for moving the ends 52 and 54 outwardly. As the clamp 46 is positioned around the connection elements 38, the pin 56 will pass through the aligned apertures 40 and 30, and the clamp 46 will be disposed between the protrusions 42 and 44 of each connection member 38, thus securely clamping the legs 32 to the tube 16. It will be apparent that removal of the clamp 46 through a reverse procedure will permit removal of the legs 32 from the tube 16 when it is desired to at least partially disassemble the apparatus 10 for storage, or the like.

The T-fitting 18 disposed at the upper end of the tube 16 as viewed in FIG. 1 comprises a sleeve member 66 adapted for slidably receiving one end of the tube 16 therein and a cross tube element 68 having the axis thereof substantially perpendicular to the axis of the sleeve 66 for removably receiving the handle 14 therethrough. The handle 14 as shown herein comprises a first elongated substantially straight rod member 70 slidably insertable through the cross tube 68 and having a crank member 72 provided at one end thereof. The crank member 72 comprises a first arm 74 substantially parallel to the rod 70 but offset therefrom by a second arm 78, as is well known. A handle member 80 is preferably secured on the first arm 76 in any well known manner (not shown) for facilitating operation of the crank 72 as will be hereinafter set forth.

Figure 4:
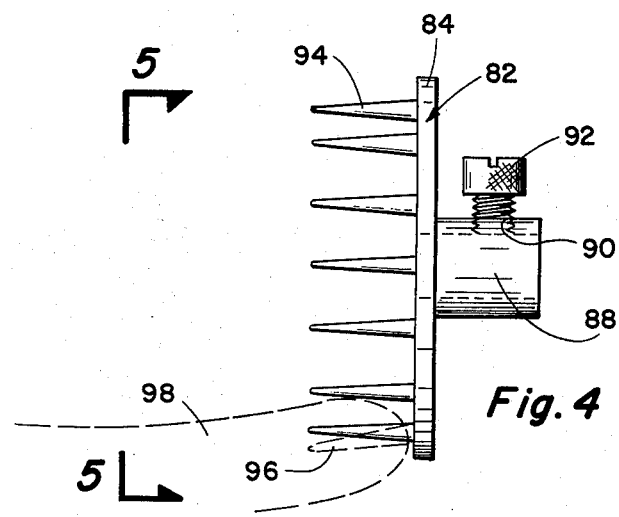
FIG. 4 is a side elevational view of an attachment member as may be utilized in the invention.

A pair of spiked disc assemblies 81 and 82 are oppositely disposed in the proximity of one end of the rod 70 and in the assembled position of the apparatus, the disc assemblies 81 and 82 are removably secured in spaced relation on the rod 70 as shown in FIG. 1. Since the assemblies 81 and 82 are substantially identical, only one will be set forth in detail herein. The disc 82 comprises a disc or plate 84 having a central aperture 86 provided therein in axial alignment with a collar 88. The collar 88 is adapted for receiving one end of the rod 70 therethrough and is provided with a threaded bore 90 in the sidewall thereof for receiving a suitable set screw 92 therethrough for bearing against the outer periphery of the rod 70 to securue the collar 88 thereon, as is well known. A plurality of axially extending circumferentially spaced spike members 94 are provided on the outer face of the disc 84 oppositely disposed from the collar 88 for a purpose as will be hereinafter set forth. Whereas the spikes 94 as shown herein are substantially perpendicularly arranged with respect to the plane of the disc 84, it is to be noted that it may be preferable for the spikes to extend slightly angularly outward as shown in broken lines at 96 in FIG. 4.

Figure 10:
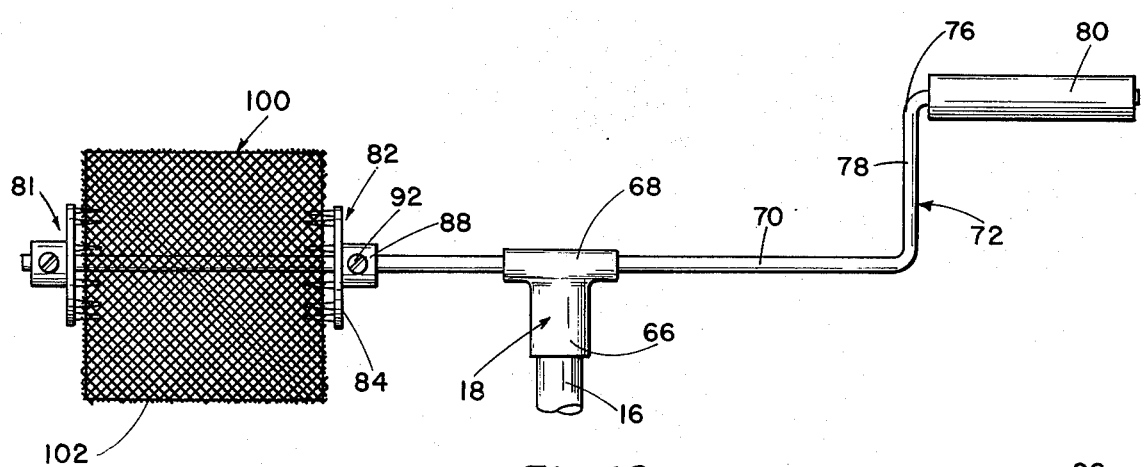
FIG. 10 is a side elevational view of a portion of a combined wiener cooker and popcorn popper embodying the invention and particularly illustrating the popcorn popper element.
Figure 11:
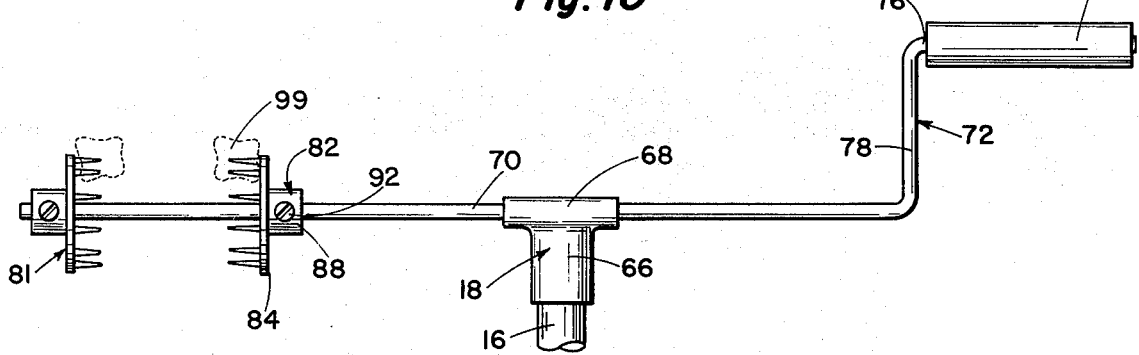
FIG. 11 is a view similar to FIG. 10 but depicting the wiener cooker element, are illustrated as possible use thereof for roasting marshmallow.

Referring now to FIG. 10, a cage or basket assembly 100 is shown which comprises a substantially cylindrical housing 102 constructed from a suitable mesh material, and having the opposite ends thereof closed with a similar mesh material with each end having a central aperture (not shown) for receiving the rod 70 therethrough. A suitable opening (not shown) is provided in the housing 102, and a door or closure member (not shown) is provided for the opening whereby access to the interior of the housing 102 is provided. The basket assembly 100 may be secured between the spaced disc assemblies 81 and 82 by inserting the spikes 94 through the end closure members as clearly shown in FIG. 10.

When it is desired to utilize the apparatus 10 for cooking wieners, the support structure 12 may be assembled as hereinbefore set forth, with the desired overall height thereof being established by the selection of the proper aperture 30 of the tube 16 for receiving the connection elements 38 and clamp 46. The rod 70 may be inserted through the cross tube 68 and the disc assemblies 81 and 82 may be secured to the outer end thereof as hereinbefore set forth, with the spacing between the disc assemblies 81 and 82 being selected complementary to the length of the wieners 98 to be cooked thereon. The wieners may be longitudinally impaled by a pair of axially aligned spikes 94 as shown broken lines in FIGS. 1 and 4. The support structure 12 may be disposed on the surface of the ground, or the like, in spaced relation to a heat source, such as a bed of coals, or the like, (not shown) whereby the wieners 98 will be supported in spaced relation above the coals. The rod 70 may be rotated about its own longitudinal axis by manual rotation of the crank 72 in the well known manner. Of course, it is to be noted that a suitable portable power source such as a battery operated motor, or the like, (not shown) may be operably connected with the rod 70 in lieu of the crank 72 for rotation thereof, if desired. As the rod 70 rotates, the disc assemblies 81 and 82 will be rotated about their longitudinal axis, thus moving the wieners 98 round and round above the heat source until they have been roasted or cooked as desired. The cooked wieners may be readily removed from the spikes 94 in any well known manner. It will be apparent that marshmallows may be impaled on the spikes 94, if desired, as shown in broken lines at 99 for roasting thereof in a similar manner.

When the apparatus 10 is to be utilized for popping popcorn, the basket assembly 100 may be secured between the spiked disc assemblies 81 and 82 in the manner as hereinbefore set forth. The popcorn may be deposited within the housing 102 through the access door (not shown) in the usual manner, and as the rod 70 is rotated about its longitudinal axis, the cage or basket assembly 100 will be simultaneously rotated about its longitudinal axis for agitating the popcorn therein during the heating thereof. In this manner the popcorn may be popped in the usual or well known manner. Of course, when the popcorn has been popped, the finished product may be removed from the housing 102 through the access door (not shown) in any well known manner.

Figure 6:
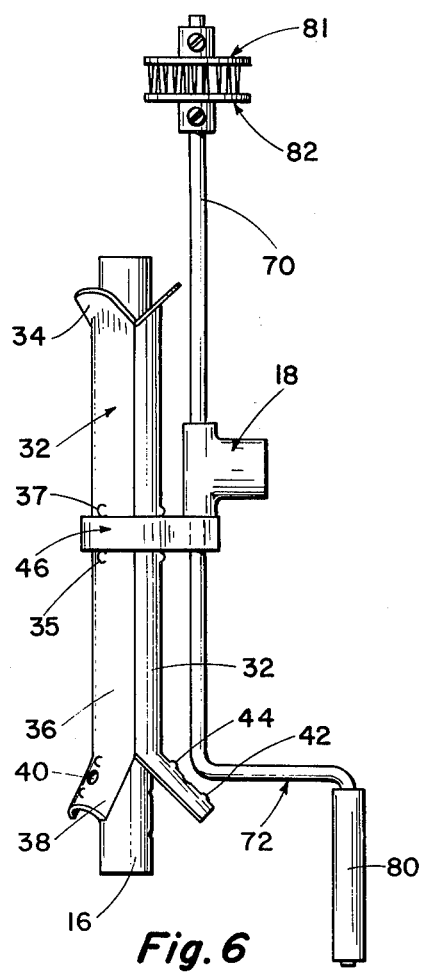
FIG. 6 is a side elevational view of a combined wiener cooker and popcorn popper embodying the invention and depicts one storage position therefor.
Figure 7:
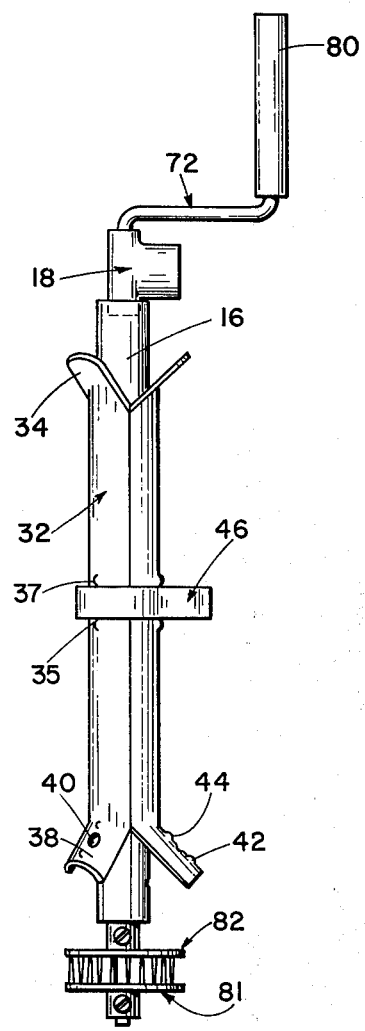
FIG. 7 is a side elevational view of a combined wiener cooker and popcorn popper embodying the invention and depicts another storage position thereof.
Figure 8:
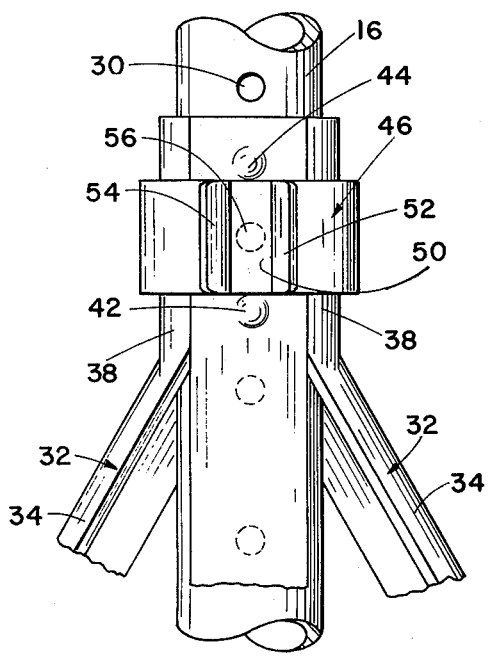
FIG. 8 is a view taken on line 8—8 of FIG. 1.

Referring now to FIGS. 6 and 7, when the apparatus 10 is to be stored or moved to a new site, the clamp 46 may be removed from engagement with the connection elements 38, and the main leg portion 34 may be disposed adjacent the outer periphery of the tube 16 in longitudinal alignment therewith as particularly shown in FIGS. 6 and 7. The aperture 33 of one of the leg portions 34 is disposed in alignment with one of the apertures 30 of the tube 16, and the clamp member 46 may be inserted therearound in the manner as hereinbefore set forth whereby the pin 56 will be inserted through the aligned apertures 30 and 33 for securing the legs 32 to the tube 16. It will be apparent that the clamp 46 will be disposed between the protrusions 35 and 37 of the leg portions 34 for retaining the clamp 46 in longitudinal position. The T-fitting 18 may then be removed from engagement with the tube 16, and the rod 70 may be "snapped" into position in the circular element 58 of the clamp 46 as shown in FIG. 6. For convenience, the spiked discs 81 and 82 may be moved in a direction toward each other whereby the spikes 94 will be intermeshed for safety during transport or storage of the device.

A still further state of disassembly for the apparatus 10 is shown in FIG. 7 wherein the legs 32 are secured to the tube 16 in the manner as shown in FIG. 6, but the rod 70 may be inserted through the tube 16 and through the passageway 26 of the insert 24 and out the aperture 22 of the flange 20. The tapered portion 28 facilitates the insertion of the rod 70 into the bore 26. The T-fitting 18 will be disposed adjacent one end of the tube 16, with the crank 72 extending therebeyond, and the spiked discs 81 and 82 may be removed from the rod 70 during insertion thereof through the tube 16, and replaced thereon with the spikes 94 intermeshed as clearly shown in the drawings.

From the foregoing it will be apparent that the present invention provides a novel combined wiener cooker and popcorn popper which may be quickly and easily assembled for use, and readily disassembled and compactly arranged for storage or transport. The novel apparatus comprises a support structure having a rod carried thereby, said rod being rotatable about its own longitudinal axis. The rod interchangeable supports a wiener holder or a popcorn popper, and rotates the same above a heat source for the desired cooking thereof.

Whereas the present invention has been described in particular relation to the drawings attached hereto, it should be understood that other and further modifications, apart from those shown or suggested herein, may be made within the spirit and scope of this invention.

What is claimed is:

1. A combined wiener cooker and popcorn popper device comprising an adjustable and collapsible support structure, an independent rod member journalled at one end of said support structure and removably secured thereto, said rod member being rotatable about its own longitudinal axis, wiener cooker means removably secured in the proximity of one end of said rod member and rotatable simultaneously therewith, and popcorn popper cage means selectively engagable with the wiener cooker means and simultaneously rotatable therewith.

2. A combined wiener cooker and popcorn popper device as set forth in claim 1 wherein the support structure comprises tubular means for supporting and journalling the rod member, a plurality of leg members removably secured to the tubular means in preselected positions for determining the overall height of the device, and clamp means releasable engagable with the leg members for removably securing the leg members to the tubular means.

3. A combined wiener cooker and popcorn popper device as set forth in claim 1 wherein the wiener cooker means comprises a pair of substantially identical oppositely disposed spiked disc assemblies removably secured to the rod member in mutually spaced relation for supporting at least one wiener therebetween, said spiked discs having relatively short spike members extending outwardly therefrom whereby each wiener is independently supported at each end by a spike of each spiked disc assembly.

4. A combined wiener cooker and popcorn popper device as set forth in claim 3 wherein the spiked disc assemblies each comprise a disc member having a central aperture therein for receiving the rod means therethrough, a collar member secured to one side of the disc member in substantial alignment with the aperture for receiving the rod means therethrough, set screw means carried by the collar member for removable engagement with the rod means, and a plurality of axially extending circumferentially spaced spike members provided on the opposite side of the disc with respect to the collar member each corresponding aligned pairs of said spike members being adapted for receiving a wiener therebetween.

5. A combined wiener cooker and popcorn popper device as set forth in claim 1 wherein the support structure comprises a tubular support member having a plurality of longitudinally spaced apertures provided in the sidewall thereof, a plurality of leg members each having an arcuate cross-sectional configuration complementary to the outer periphery of the tubular support member, each of said leg members having at least one aperture provided therein for selective alignment with one of the apertures of the tubular support member, and clamping means engagable with the leg members and cooperating with the aligned apertures for removably securing the leg members to the tubular support member.